Patented Jan. 12, 1932                                                      1,840,807

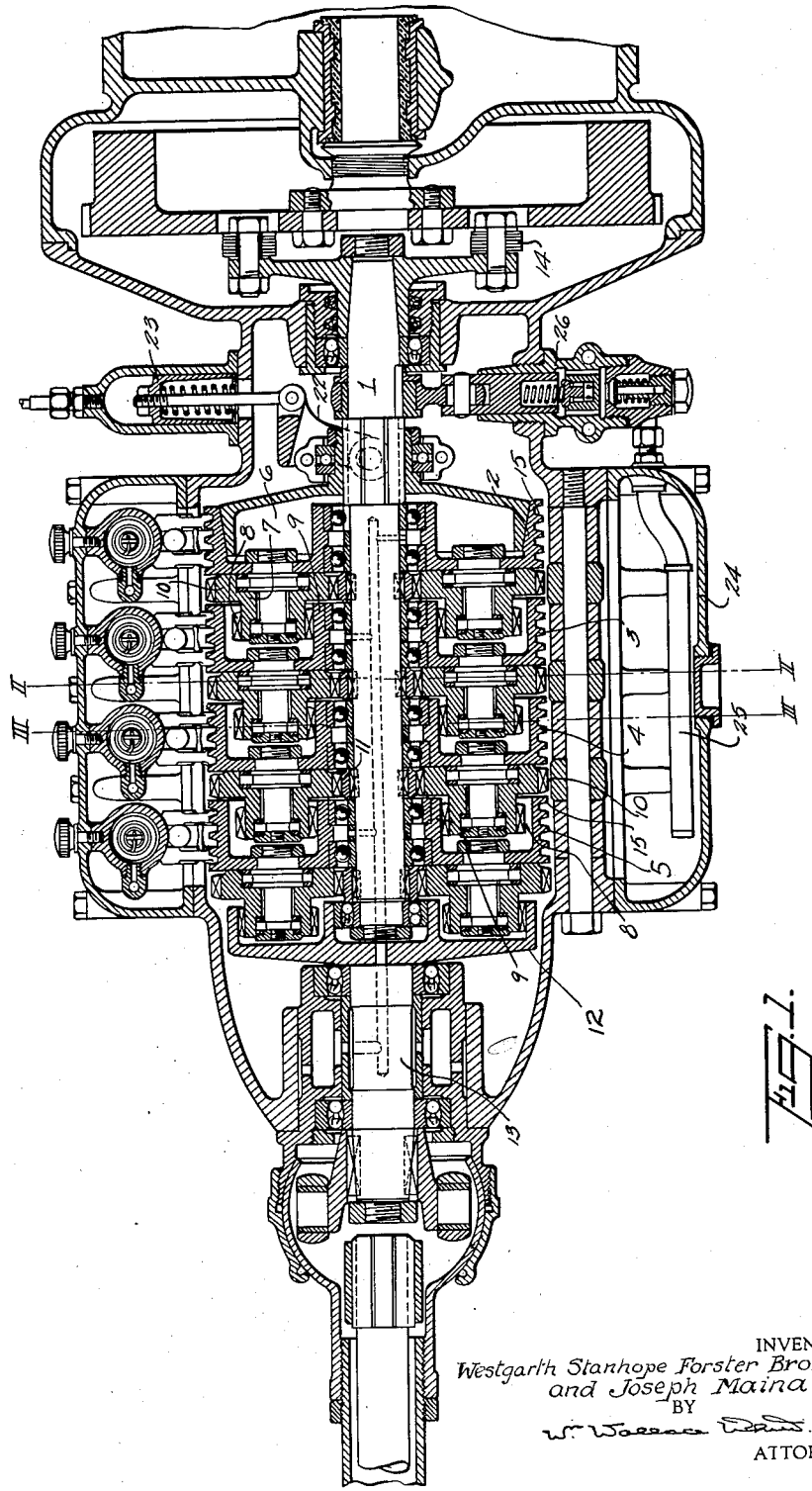

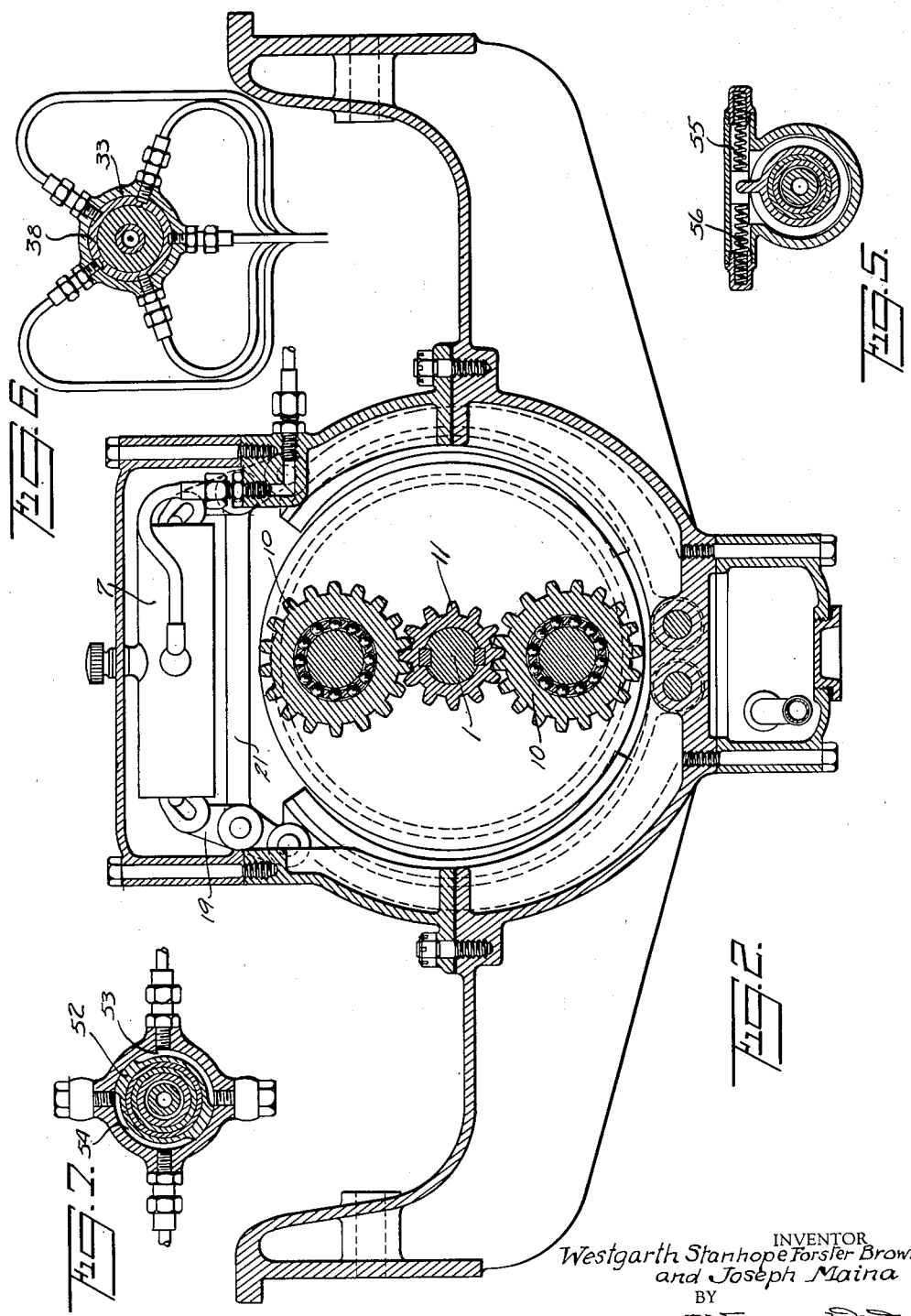

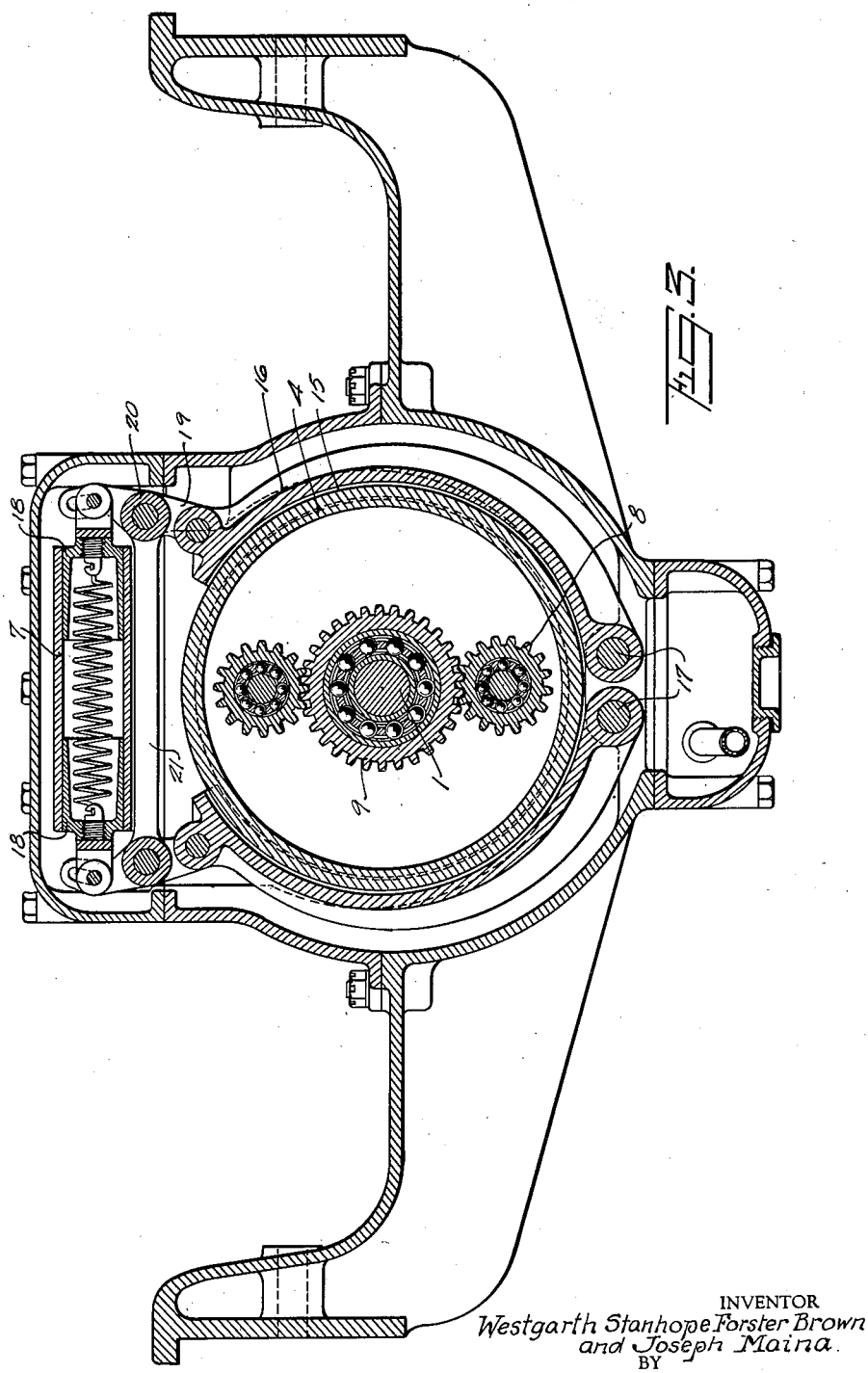

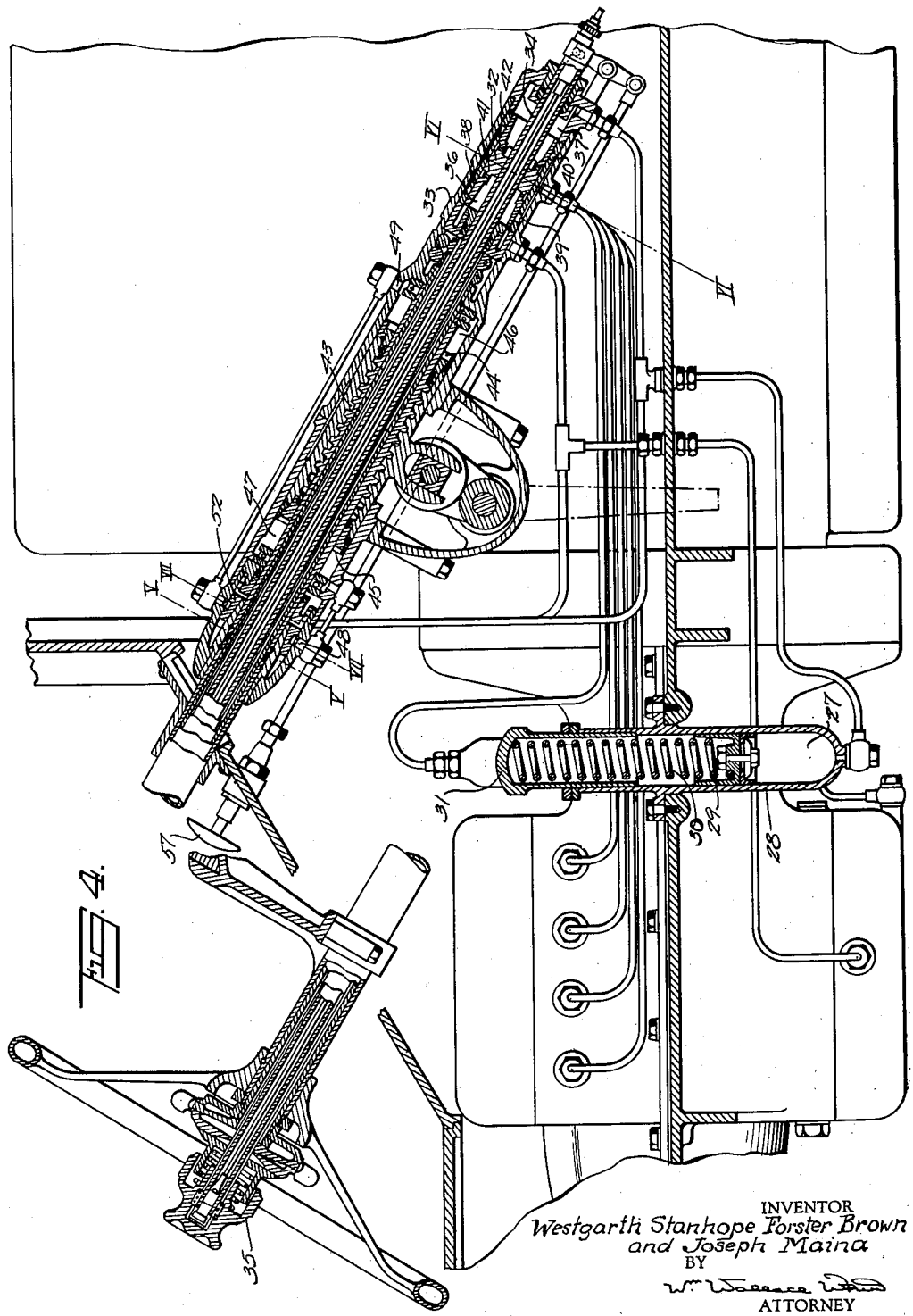

UNITED STATES PATENT OFFICE

WESTGARTH STANHOPE FORSTER BROWN AND JOSEPH MAINA, OF LONDON, ENGLAND, ASSIGNORS TO THE F. B. M. GEAR SYNDICATE, LIMITED, OF LONDON, ENGLAND

HYDRAULIC CONTROL MECHANISM

Original application filed February 4, 1926, Serial No. 85,981, and in Great Britain February 5, 1925. Divided and this application filed May 11, 1928. Serial No. 277,089.

This invention is a division of our Patent No. 1,673,863, and relates to hydraulic control mechanism for power transmission means. This control mechanism is particularly applicable to variable speed gears and more particularly to variable speed gears of the type in which different speed ratios are obtained by compounding a plurality of epicyclic elements.

According to this invention, we operate brake shoes on drums integral with suitable controlling members in the gear, and also operate a toggle-fork for a clutch operation for the direct drive, by hydraulic means, the mechanism comprising shoes adapted to be pressed on the drums by a plunger or plungers, the fluid pressure actuating the plunger or plungers being provided by a pump operated mechanically or by hand or pedal.

A single pump is preferably provided and a valve is adapted to transmit the pressure to each of the elements in the breaking system. The valve is preferably situated in or operated from the hub of the steering wheel and is provided with a suitable graduated dial. The valve may be adapted to receive a rotary as well as an axial displacement, so that a sequence of openings in the distribution system could be interrupted for the purpose of selecting any particular gear without engaging other gears.

Referring to the accompanying drawings, which illustrate one particular manner of carrying out the invention:

Figure 1 is a longitudinal section as applied to a variable speed epicyclic gear as described in our said Patent No. 1,673,863.

Fig. 2 is a transverse section along line II—II of Fig. 1;

Fig. 3 is a transverse section along line III—III of Fig. 1;

Fig. 4 is a view, partly in section, of the controlling device;

Figs. 5, 6 and 7 are detail sectional views along lines V—V, VI—VI, and VII—VII, respectively, of Fig. 4.

The gear is designed for four forward and reverse drives and is similar to that described in the said Patent No. 1,673,863.

The gear consists of four operative trains of gear mounted loose on the primary shaft 1. 2 is the element for the third speed; 3 for the second; 4 for the first, and 5 for the reverse. The element 2 is adapted to be engaged with the primary shaft by clutch 6.

Each of the operative trains comprises a grooved drum 15, the hub of which is formed with the teeth of a secondary sun wheel 9. Two groups of satellite pinions are mounted on the drum. Each group of satellites has one small pinion 8 and one large pinion 10.

All the satellite groups in all the trains are of the same size and so are the drums, with the exception of the third speed operative train 2 the hub of which remains plain.

All the drums are mounted loose on the primary shaft 1 on which sun wheels 11 are solidly mounted. Each sun wheel 11 is in mesh with one of the large pinions 10, and each small pinion 8 is in mesh with secondary sun wheel 9 of the following train.

The compounding of the several operative trains constitutes the epicyclic gear, the last element of which is related to the secondary shaft by the small pinion 8 and the last group of satellites being in mesh with an internal gear 12 integral with the secondary shaft 13. The secondary shaft is supported independently at the rear of the casing. A flexible joint 14 couples the primary shaft to the fly-wheel of the engine.

Shoes 16 are mounted on pivot bars 17 and are adapted to be pressed on each drum by a set of levers 19 linked by bar 21 and mounted on bosses 20.

The levers 19 are connected to opposed pistons 18, 18 mounted in a cylinder 7 and subject to be expanded by hydraulic pressure. Similarly the clutch 6 is brought into engagement by hydraulic pressure acting on piston 23 and fork 22.

The lubricating oil of the gear is employed as hydraulic medium, and is pumped by pump 26 from the sump 24 through a filter 25 to a mechanical accumulator 27 in which a piston 29 moves under pressure of oil in a cylinder 28 against a spring 30 adjustable by cap 31. The movement of the piston allows a variable volume of oil to be stored, and the spring maintains a more or less constant pressure between 120 and 150 lbs. per square inch, and an automatic by-pass valve returns the surplus oil to the sump.

The piston valve 32 is mounted in cylinder 33 on piston rod 34, which terminates at the top end in the centre of the steering wheel with a knob 35. The cylinder 33 is divided by the piston 32 into two compartments; 36 for the discharge and 37 for the pressure. The discharge communicates by piping with the sump of the gear, and the pressure communicates to the mechanical accumulator 27. A liner 38 in which the piston fits accurately, is mounted in cylinder 33, and is provided with five holes 39 on the discharge side, and five holes 40 on the pressure side. The holes 39 and 40 lead through a common pipe to the respective operative cylinders 7 of the gear. The arrangement is so designed that when any one operative cylinder 7 is under pressure, all the others communicate with the discharge, and the selection of any one gear is effected by rotating the knob 35, and therefore the piston 32.

Grooves 41 and 42 are provided on the piston valve 32 at the discharge and pressure side, and are so arranged that the axial pull of the piston valve will communicate the whole of the five operative cylinders of the gear with the discharge, thereby causing the gear to be in neutral. Axial push of the piston valve will communicate the whole of the five operative cylinders of the gear with the pressure side, thereby causing the whole of the operative trains to be restrained and acting as a transmission brake.

Contrary to the system adopted by certain epicyclic gears which, in running forward, operate on the reverse element as a transmission brake (although this could also be effected on our gear), we claim that by our method of operating on all the restraining members a very considerable surface is available and the brake, although very powerful, is subject to the minimum wear.

A clutch pedal 57 is provided which operates the piston valve 32 and puts the gear in neutral.

This system of hydraulic control is independent of any occasional leak that in unusual circumstances might occur through wear of the pistons or of the packing glands, so long as the supply of oil is sufficient and above the minimum pressure in the circuit, this being obtained by the site of the pump adopted.

We have embodied in our design a self-assisting steering unit combined with the gear control.

This steering gear is of the worm and nut type. The nut block 43 acts as a double-acting piston, the ends of which 44, 45 correspond to cylindrical chambers 46, 47, which are adapted to communicate by a valve 52 (Fig. 7), through holes 48, 49 with the pressure port 53 or the discharge port 54 in such a way that when one end is receiving pressure, the other end is on the discharge, or vice-versa. The valve 52 oscillates left or right against two opposed springs 55, 56 (Fig. 5) which maintain the valve normally in a position whereby the holes leading to the chambers 46, 47 are closed when the steering gear is set for a straight direction, in which case the oil contained in chambers 46, 47, having no outlet, will act as a damping medium, thereby absorbing the shocks and vibration, and preventing movement of the steering arm and wobbling of the front wheels.

In the act of steering, as the driver begins to rotate the steering mast, the valve 52 through friction oscillates in the same direction, during a short space of time, until one of the compensating springs 55 or 56 brings back the valve into its original intermediate position. During the oscillation phase of the valve 52 pressure is admitted on one side or the other of the nut block 43, and the action of steering is thereby assisted, relieving the driver of the effort of steering.

The worm and nut block arrangement, which is hereby retained, answers an important requirement of security, and is robust, positive, and irreversible.

Gas and ignition control are arranged concentrically around the gear controlling knob. The electric horn control is arranged in the centre of the knob following standard practice.

Having now thus fully described our invention what we claim and desire to secure by Letters Patent is:

1. In variable speed gearing, of the character described, a drum, shoes pivoted about the periphery of said drum, a fixed cylinder disposed between said shoes, a pair of opposed pistons therein, pivoted levers connecting the pistons and shoes, a link connecting the pivots of said levers, and movable relatively to said cylinder, a spring connecting said pistons to normally hold the shoes from engagement with the drum and means for hydraulically causing such engagement.

2. In variable speed gearing, of the character described, a grooved drum, a pair of shoes pivoted about the periphery of the drum, a fixed cylinder disposed between the shoes, a pair of opposed pistons in said cylinder, pivoted levers connecting said pistons and shoes respectively, means comprising a movable link connecting the opposed pistons and normally keeping the shoes out of engagement with the drum, and means for hydraulically causing engagement of the shoes to brake the drum.

3. In variable speed gearing, of the character described, a grooved drum, pivoted shoes having peripheral grooves therein mounted about the periphery of said drum, a fixed cylinder extending between the shoes, a pair of opposed pistons connected to said shoes, means comprising a movable link for holding the shoes out of contact with the drum and means for hydraulically effecting such contact.

4. In a gearing of the character described, a braking device comprising a grooved rotary drum, a pair of similarly grooved brake shoes mounted on fixed pivots adjacent to the periphery of said drum, a lever pivoted to each shoe, a movable connecting link between said levers, a piston jointed to each lever, a spring by which the said pistons are pulled towards each other, and hydraulic control means comprising a fixed common cylinder enclosing the said pistons and means for supplying hydraulic pressure to the said cylinder to move the said pistons apart and thus close the shoes upon the said drum.

5. In a gearing of the character described, a braking device comprising a grooved rotary drum a pair of similarly grooved brake shoes mounted on fixed pivots adjacent to the periphery of said drum, a fixed cylinder mounted at right angles to the axis of the drum, a pair of opposed pistons in the cylinder, a relatively movable link parallel to said cylinder and adjacent to the drum, a lever fulcrumed to each end of the said link and connected at one end to one of the brake shoes and at the opposite end to one of the pistons, spring means for moving the pistons in one direction and hydraulic means for moving the pistons in the opposite direction to operate the brake shoes.

6. In a gearing of the character described, a braking device comprising a grooved rotary drum, a pair of internally grooved brake shoes mounted on fixed pivots adjacent to the periphery of said drum, a fixed cylinder adjacent to the drum, a pair of pistons in the cylinder, a lever connecting each piston to the swinging end of each pivoted shoe, a movable connecting link between the said levers, and spring and hydraulic pressure means for operating the said pistons to control the brake device.

In testimony whereof we have signed our names to this specification.

WESTGARTH STANHOPE FORSTER BROWN.
JOSEPH MAINA.